(12) United States Patent
Yoshida et al.

(10) Patent No.: US 9,734,935 B2
(45) Date of Patent: Aug. 15, 2017

(54) WIRE HARNESS

(71) Applicant: YAZAKI CORPORATION, Tokyo (JP)

(72) Inventors: Hiroyuki Yoshida, Kosai (JP); Eiichi Tohyama, Kosai (JP); Tatsuya Oga, Kosai (JP); Shinichi Inao, Kosai (JP); Masaaki Suguro, Kosai (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 14/448,027

(22) Filed: Jul. 31, 2014

(65) Prior Publication Data
US 2014/0338971 A1 Nov. 20, 2014

Related U.S. Application Data

(63) Continuation of application No. PCT/JP2013/052644, filed on Jan. 30, 2013.

(30) Foreign Application Priority Data

Feb. 1, 2012 (JP) .................................. 2012-019509

(51) Int. Cl.
H01B 7/00 (2006.01)
H02G 3/04 (2006.01)
B60R 16/02 (2006.01)

(52) U.S. Cl.
CPC ....... *H01B 7/0045* (2013.01); *B60R 16/0215* (2013.01)

(58) Field of Classification Search
CPC ...... H01B 7/0045; H02G 3/0468; H02G 3/04; H02G 3/06; H02G 3/30; H02G 3/0487; H02G 3/0691; H02G 11/00; B60R 16/02; B60R 16/0215; F16B 5/10; F16L 3/1091; H01R 13/46; H01R 13/73; Y10S 285/903; Y10T 29/49117

USPC ....................................... 174/72 A; 285/149.1
See application file for complete search history.

(56) References Cited

U.S. PATENT DOCUMENTS

| 2004/0099427 | A1 | 5/2004 | Kihira | |
|---|---|---|---|---|
| 2005/0092511 | A1* | 5/2005 | Sekino | B60R 16/0215 174/72 A |
| 2007/0025061 | A1* | 2/2007 | Kogure | B60R 16/0215 361/437 |
| 2008/0035800 | A1* | 2/2008 | Yamamoto | F16L 3/015 248/70 |

(Continued)

FOREIGN PATENT DOCUMENTS

| EP | 2317619 A1 | 5/2011 |
|---|---|---|
| JP | 2001204120 A * | 7/2001 |

(Continued)

OTHER PUBLICATIONS

Search Report dated May 2, 2013, issued by the International Searching Authority in counterpart International Application No. PCT/JP2013/052644.

(Continued)

*Primary Examiner* — Timothy Thompson
*Assistant Examiner* — Guillermo Egoavil
(74) *Attorney, Agent, or Firm* — Sughrue Mion, PLLC

(57) ABSTRACT

A wire harness comprises one or a plurality of electrically conductive paths, a tubular body into which the one or plurality of electrically conductive paths are to be inserted, and a protector to be engaged with a terminal of the tubular body, wherein the protector has a terminal engagement section to be engaged with the terminal of the tubular body, and a roll prevention portion which serves as an area that is mounted on a predetermined mounting surface without rolling, is formed in the terminal engagement section.

4 Claims, 6 Drawing Sheets

(56) References Cited

U.S. PATENT DOCUMENTS

| | | | |
|---|---|---|---|
| 2010/0164226 A1* | 7/2010 | Serizawa | F16L 3/1091 |
| | | | 285/149.1 |
| 2011/0132638 A1 | 6/2011 | Oga et al. | |
| 2013/0008711 A1 | 1/2013 | Toyama et al. | |
| 2013/0118777 A1 | 5/2013 | Yamaguchi et al. | |

FOREIGN PATENT DOCUMENTS

| | | |
|---|---|---|
| JP | 2008-308068 A | 12/2008 |
| JP | 2008-308070 A | 12/2008 |
| JP | 2010220362 A | 9/2010 |
| JP | 2011193677 A | 9/2011 |
| JP | 2011-229203 A | 11/2011 |
| JP | 2012-143028 A | 7/2012 |
| WO | 2012011502 A1 | 1/2012 |

OTHER PUBLICATIONS

Written Opinion dated May 2, 2013, issued by the International Searching Authority in counterpart International Application No. PCT/JP2013/052644.
Communication dated Sep. 6, 2015 issued by The State Intellectual Property Office of the People's Republic of China with counterpart Chinese Application No. 201380007605.7.
Machine Translation of JP 2004-171952 A, Jun. 17, 2004, Auto Network Gijutsu Kenkyusho; Sumitomo Wiring Syst Ltd; Sumitomo Electric Ind Ltd.
Office Action issued on Nov. 17, 2016 by the Japanese Patent Office in counterpart Japanese Application No. 2012-019509.

* cited by examiner

WIRE HARNESS

CROSS REFERENCE TO RELATED APPLICATIONS

This application is a continuation of PCT application No. PCT/JP2013/052644, which was filed on Jan. 30, 2013 based on Japanese Patent Application (No. 2012-019509) filed on Feb. 1, 2012, the contents of which are incorporated herein by reference.

BACKGROUND OF THE INVENTION

1. Field of the Invention

The present invention relates to a wire harness.

2. Description of the Related Art

A high voltage wire harness is used in order to electrically interconnect equipments in a hybrid automobile or an electric vehicle; specifically, a motor unit, an inverter unit, and a battery.

The wire harness disclosed in PTL 1 has three electric wires for electrically interconnecting equipments and a metal pipe that accommodates and shields the great majority of the entire length of the three electric wires.

CITATION LIST

Patent Literature

[PTL 1] JP-A-2004-171952

When a configuration of the wire harness includes a metal pipe (a tubular body) as with the related art, the metal pipe is used after being cut into a required length. Accordingly, an edge (including burrs or the like) possibly occurs along a brim of an end opening of the metal pipe. Upon contact with sheathes of the electric wires, the edge may inflict damage to them.

Incidentally, since the metal pipe assumes a circular cross sectional profile, it easily rolls when placed on a flat surface, which might affect workability at the occasion of insertion of the three electric wires (electrically conductive paths) into the metal pipe. The metal pipe has a long length, and if the metal pipe rolls at the occasion of insertion of the three electric wires, a sequence of the electric wires aligned on a wire entry side of the metal pipe may differ from a sequence of the electric wires aligned on a wire exit side, which might also affect workability.

If a twist, or the like, occurs in electric wires during work operation for inserting the electric wires, the electric wires pulled out of a terminal of the pipe will be uncertainly oriented with reference to; for instance, a horizontal surface. In addition to electric wires, a cabtyre cable, and the like, is also mentioned as one vulnerable to uncertain orientation. The twist in electric wires will result in a dimensional change, which will also come to cause variations in finished dimension of the wire harness.

Even if the metal pipe is inhibited from rolling by use of a jig, or the like, in order to address a drawback, such as that mentioned, time is consumed by work operation for attaching and detaching the jig. Although another conceivable way is to perform additional work on a metal pipe without use of the jig, or the like, the additional work will incur a corresponding cost increase.

SUMMARY OF THE INVENTION

The present invention has been conceived in light of the circumstance, and a challenge to be met by the present invention is to provide a wire harness that can assure stable quality by preventing occurrence of dimensional variations, not to mention, inhibiting infliction of damage to an electrically conductive path and that can also curtail cost by improving ease of work conducted to insert the electrically conductive path and obviating additional work on a tubular body.

A wire harness of the present invention described in a first aspect of the present invention comprises one or a plurality of electrically conductive paths, a tubular body into which the one or plurality of electrically conductive paths are to be inserted, and a protector to be engaged with a terminal of the tubular body, wherein the protector has a terminal engagement section to be engaged with the terminal of the tubular body, and a roll prevention portion which serves as an area that is mounted on a predetermined mounting surface without rolling, is formed in the terminal engagement section.

Under the present invention having such a characteristic, even if an edge is present in the terminal of the tubular body, the electrically conductive path(s) is not affected by the edge. The reason for this is that the wire harness has the terminal engagement section to be engaged with the terminal of the tubular body. Further, under the present invention, even when mounted on a predetermined mounting surface while the protectors remain engaged with the terminal of the tubular body, the tubular body will not roll. Furthermore, even when the electrically conductive path(s) is inserted into the tubular body, a twist will become less likely to occur. This is because the roll prevention portion is formed in the terminal engagement section.

In a wire harness of the present invention defined in a second aspect according to the first aspect, when the one or the plurality of electrically conductive paths is set to one, the one electrically conductive path includes a plurality of conductors aligned in a predetermined direction; when the one or the plurality of electrically conductive paths are set to plural electrically conductive paths, the plurality of electrically conductive paths are aligned in a predetermined direction; an electrically conductive path pullout hole is formed in the terminal engagement section as an area where the one or the plurality of electrically conductive paths are pulled out of the tubular body; and the electrically conductive path pullout hole is formed into a shape so as to maintain the alignment achieved in the predetermined direction.

Under the present invention having such a characteristic, the electrically conductive path(s) pulled out of the tubular body will not become uncertainly oriented with respect to the predetermined loading/positioning surface. The reason for this is that twist prevention described in the first aspect is effected. Moreover, the aligned state of the electrical conductors and the aligned state of the electrically conductive path(s) are maintained by the shape of the electrically conductive path pullout hole formed in the terminal engagement section.

In the wire harness of the present invention defined in a third aspect according the first or second aspect, the roll prevention portion is formed into one planar shape or a plurality of planar shapes.

Under the present invention having such a characteristic, even when placed on the predetermined loading/positioning surface while the protector remains engaged with the terminal of the tubular body, the tubular body will not roll. The reason for this is that the roll prevention portion that makes a surface contact with respect to the loading/positioning surface when the wire harness is placed. The shape of the roll prevention portion is not limited to the planar shape, and forming the roll prevention portions into a protruding shape capable of making; for instance, two point contacts or three point contacts, is also effective. The roll prevention portions of the present invention also serve as fiducial surfaces for various types of work and processing operation.

The present invention defined in the first aspect of the present invention is directed to the wire harness including as its configuration the terminal engagement section to be engaged with the terminal of the tubular body and the protector that includes the roll prevention portion formed in each of the terminal engagement section. Therefore, there are yielded an advantage of the ability to protect the electrically conductive path(s) pulled out of the tubular body and another advantage of the ability to prevent rolling of the tubular body, to thus provide a stable position of the tubular body and, by extension, enhance workability. Further, under the present invention, the position of the tubular body is made stable, to thus be able to contribute to preventing occurrence of a twist in the electrically conductive path(s) and dimensional variations attributable to the twist. This also yields an advantage of the ability to provide stable quality. Twist prevention enables inevitable pullout of the electrically conductive path in a predetermined orientation and, for this reason, is effective. Furthermore, enhancement of workability and prevention of occurrence of dimensional variations are achieved concurrently with protection of the electrically conductive path(s). Accordingly, a necessity for making additional work on the tubular body and addition of a custom-designed component can be obviated, which in turn yields an advantage of the ability to cost reduction.

Under the present invention defined in connection with the second aspect, the electrically conductive path pullout hole is formed in the terminal engagement section. The electrically conductive path pullout hole is formed into a shape that makes it possible to maintain an aligned state of the conductors and the electrically conductive path(s). Therefore, the electrically conductive path(s) is prevented from being uncertainly oriented, which eventually contributes to preventing occurrence of a twist in the electrically conductive path(s) and dimensional variations. Accordingly, there is yielded an advantage of the ability to contribute to providing stable quality.

Under the present invention defined in connection with the third aspect, the roll prevention portion is formed into a shape with one or a plurality of surfaces. Therefore, there is yielded an advantage of the ability to contribute to preventing rolling of the tubular body and making a position of the tubular body stable.

DETAILED DESCRIPTION OF THE EXEMPLARY EMBODIMENTS

A wire harness includes one or a plurality of electrically conductive paths, a tubular body into which the electrically conductive paths are to be inserted, and protectors to be engaged with both terminals of the tubular body, respectively. Each of the protectors has a terminal engagement section to be engaged with the terminal of the tubular body, and a roll prevention portion is formed at the terminal engagement section.

(First Embodiment)

Figure 1:
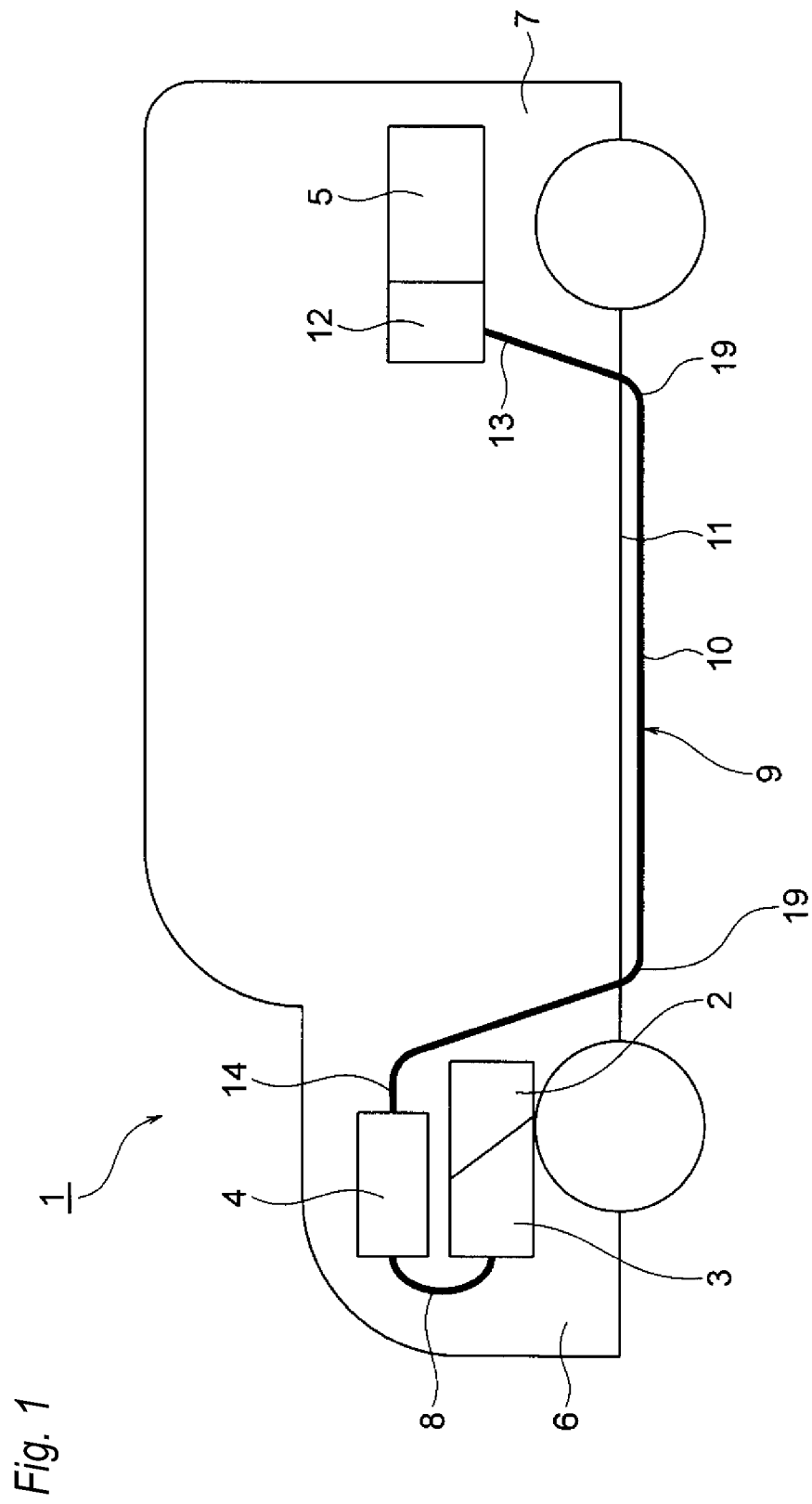
FIG. 1 is a diagrammatic view showing a routed state of a wire harness of the present invention.
Figure 2:
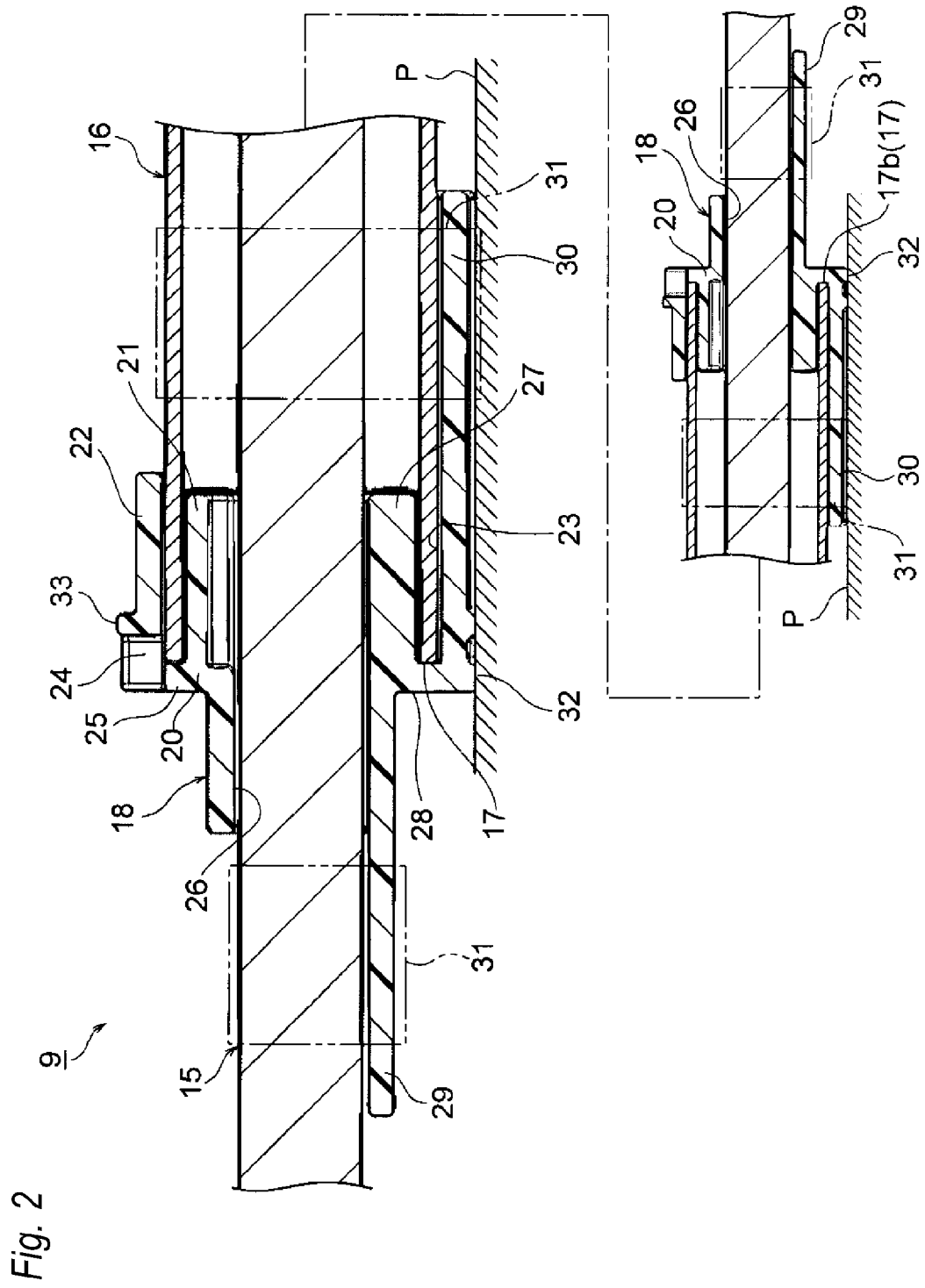
FIG. 2 is a cross sectional view of protectors, a tubular body, and an electrically conductive path.
Figure 3:
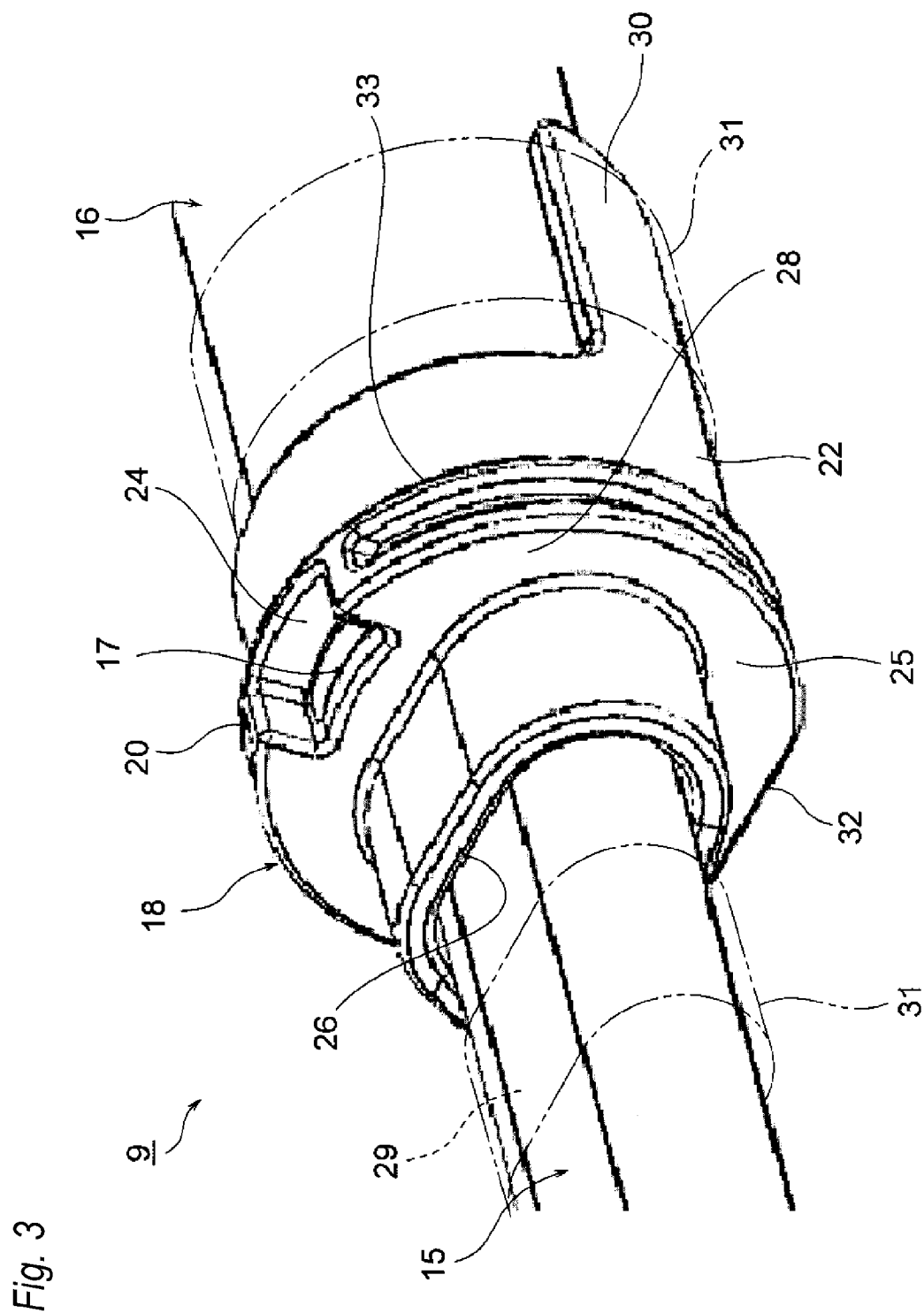
FIG. 3 is a perspective view of the protector at one terminal of the tubular body, the tubular body, and the electrically conductive path.
Figure 4:
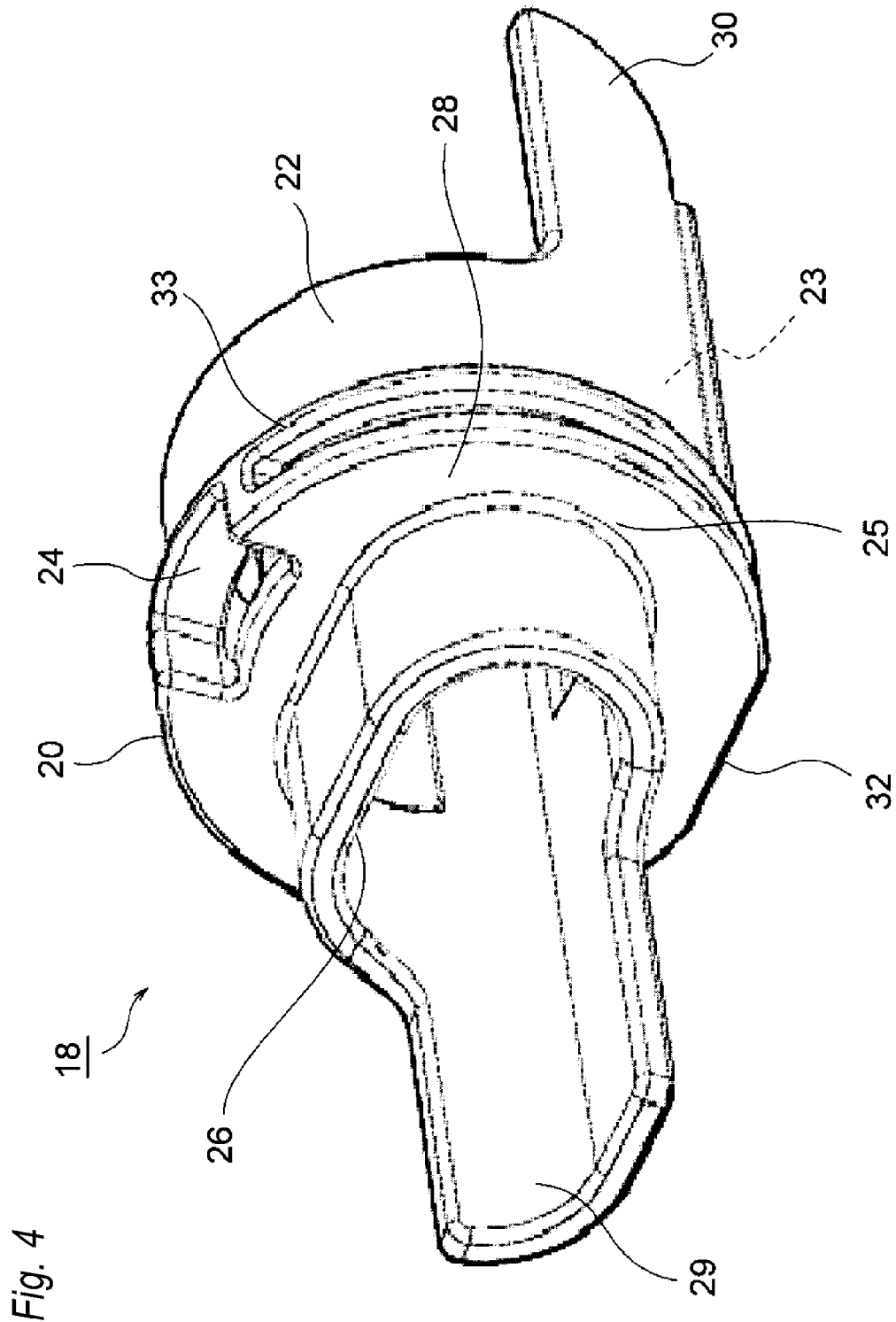
FIG. 4 is a perspective view of one of the protectors.
Figure 5:
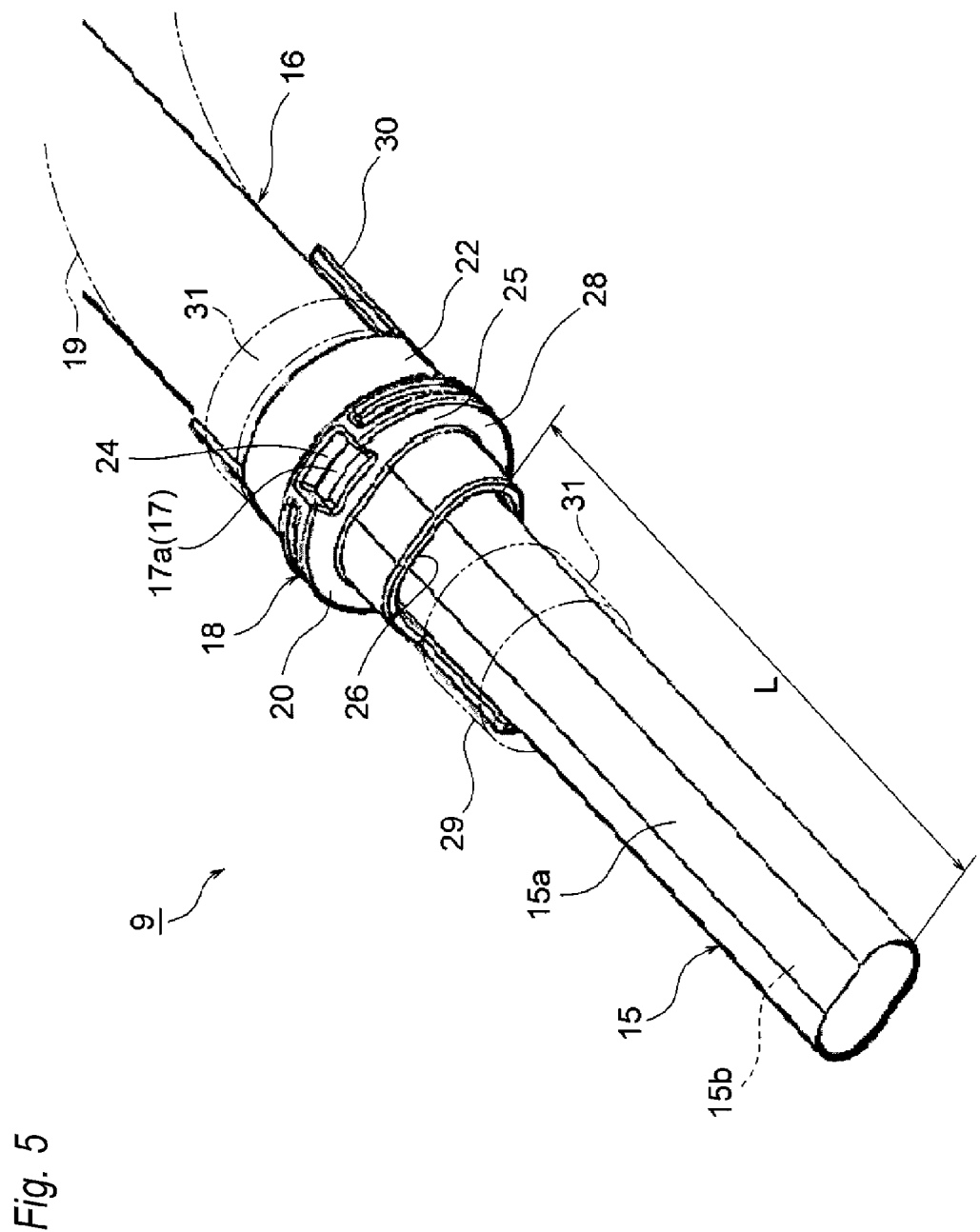
FIG. 5 is a perspective view of the protector at one terminal of the tubular body, the tubular body, and the electrically conductive path achieved while the electrically conductive path is pulled in a certain direction.

A first embodiment is hereunder described by reference to the drawings. FIG. 1 is a diagrammatic view showing a routed state of a wire harness of the present invention. FIG. 2 is a cross sectional view of protectors, a tubular body, and an electrically conductive path. FIG. 3 is a perspective view of the protector at one terminal of the tubular body, the tubular body, and the electrically conductive path. FIG. 4 is a perspective view of one of the protectors. FIG. 5 is a perspective view of the protector at one terminal of the tubular body, the tubular body, and the electrically conductive path achieved while the electrically conductive path is pulled in a certain direction.

In the embodiment, the present invention shall be adopted for a wire harness to be routed through a hybrid automobile (which can also be an electric vehicle or a common automobile).

In FIG. 1, reference numeral 1 designates a hybrid automobile. The hybrid automobile 1 is a vehicle that is driven by means of a mixture of two types of power, one from an engine 2 and the other from a motor unit 3. Electric power is fed to the motor unit 3 from a battery 5 (a battery pack) 5 by way of an inverter unit 4. The engine 2, the motor unit 3, and the inverter unit 4 are mounted in an engine room 6 where front wheels, or the like, are situated, in the embodiment. The battery 5 is mounted in an automobile rear block 7 where rear wheels, or the like, are situated (the battery can also be mounted in an automobile compartment located behind the engine room 6).

The motor unit 3 and the inverter unit 4 are connected to each other by means of a high voltage wire harness 8. The battery 5 and the inverter unit 4 are also connected together by means of a high voltage wire harness 9. An intermediate portion 10 of the wire harness 9 is routed on a ground side of a vehicle body under-floor portion 11. The wire harness 9 is also routed substantially in parallel with the vehicle body under-floor portion 11. The vehicle body under-floor portion 11 is a known body and also serves as a so-called panel member. A through hole (whose reference numeral is omitted) is formed in predetermined positions. The wire harness 9 is inserted into the through holes.

The wire harness 9 and the battery 5 are connected to each other by way of a junction block 12 provided in the battery 5. A rear end 13 of the wire harness 9 is electrically connected to the junction block 12 by means of a known method. A front end 14 of the wire harness 9 is electrically connected to the inverter unit 4 by means of a known method.

The motor unit 3 is presumed to be configured by including a motor and a generator. Further, the inverter unit 4 is presumed to be configured by inclusion of an inverter and a converter. The motor unit 3 is presumed to be formed as a motor assembly including a shielding case. The inverter unit 4 is also presumed to be formed as an inverter assembly including a shielding case. The battery 5 is an Ni-MH-based or Li-ion-based battery and presumed to be module-configured. Incidentally, for instance, a rechargeable battery; for instance, a capacitor, can also be used. The battery 5 is not limited to any specific type, so long as it can be used for the hybrid automobile 1 or the electric vehicle.

First, a configuration and structure of the wire harness 9 are described. In FIGS. 2 and 3, the wire harness 9 is made up of an electrically conductive path 15, a tubular body 16 into which the electrically conductive path 15 is inserted; protectors 18 to be engaged with one terminal 17a and another terminal 17b of the tubular body 16 (when both terminals are collectively referred to, they are called a terminal 17); and an un-illustrated equipment connection section.

One high voltage cabtyre cable that assumes an oblong cross sectional profile in the embodiment is employed as the electrically conductive path 15 in the first embodiment. The electrically conductive path 15 includes two conductors aligned side by side while spaced apart from each other, insulators each of which covers one conductor, a sheath that collectively sheathes the high voltage electric wires. The electrically conductive path 15 is formed so as to assume a length required for an electrical connection.

The high voltage electric wire made up of the conductors and insulators can also be deemed as an electrically conductive path. A high voltage electrically conductive path embodied by equipping a known bus bar with an insulator, including a known high voltage electric wire, can also be mentioned as the electrically conductive path 15. A conductor structure of the high voltage electric wire can also be either a conductor structure made by twisting strands or a rod-shaped conductor structure (a conductor structure made of; for instance, a round single core) having; for instance, a round cross sectional profile. The conductor is fabricated from copper, a copper alloy, aluminum, or an aluminum alloy.

Each of terminals of the electrically conductive path 15 is equipped with terminal hardware. The terminal hardware makes up the un-illustrated equipment connection section. Such terminal hardware is connected to an electrical connection section by a known method after being inserted into an interior of a shield case, such as the inverter unit 4. It is effective to pull the electrically conductive path 15 out of the terminal 17 of the tubular body 16 to a predetermined length for electrical connection in a predetermined orientation.

In the embodiment, reference numeral 15a designates an upper surface of the electrically conductive path 15, and reference numeral 15b designates a lower surface of the electrically conductive path. While the electrically conductive path 15 remains pulled out of the terminal 17 of the tubular body 16, the upper surface 15a is oriented upward, and the lower surface 15b is oriented downward in the drawing. Since the electrically conductive path 15 has the protectors 18 to be described later, the electrically conductive path 15 is inserted into the tubular body 16 without a twist.

The tubular body 16 is an exterior member for the wire harness 9. A metal pipe (e.g., an aluminum pipe) is adopted in the embodiment. The tubular body 16 is formed so as to assume a length and an inner diameter required to accommodate the electrically conductive path 15. The tubular body 16 is also formed in thickness required to exhibit a protective function.

The tubular body 16 is not restricted to the metal pipe but can also be a tubular body made of a resin. The tubular body 16 is formed so as to assume a circular cross sectional profile in the embodiment (the cross sectional profile shall be a mere example and can also be an ellipsoidal shape, an oval shape, or a rectangular shape).

Such a tubular body 16 is subjected to bending in conformance with a routing path of the wire harness 9. Reference numeral 19 (see FIG. 1 and FIG. 5) designates a bend. For instance, an un-illustrated bender is used for bending work.

The tubular body 16 does not encounter any problems even when the terminals 17 are left as they are after being cut from a long-length tubular body. Edges (including burrs, or the like) along opening edges of the respective terminals are covered as a result of the respective protectors 18 being engaged with the respective terminals 17. Each of end faces of the tubular body 16 is formed as a surface that is orthogonal to an axis of the tubular body 16. The protectors 18 are formed so as to butt against such end faces, respectively. The protectors 18 that are engaged with the respective terminals 17 of the tubular body 16 are hereinbelow described in detail.

In FIGS. 2 through 4, the protectors 18 are members that engage with the respective terminals 17 of the tubular body 16 as mentioned above and each have a terminal engagement section 20 as the engagement section. Each of the terminal engagement sections 20 is formed substantially into a cap shape that covers each of the terminals 17. Specifically, each of the protectors 18 has an interior insert 21, an exterior insert 22, a terminal insert groove 23, a confirmation opening 24, a terminal opening cover 25, an electrically conductive path pullout hole 26, and a roll prevention portion 32 and is formed substantially into a cap shape.

The interior insert 21 is formed as an area that is to be inserted and placed on an interior side of the tubular body 16 when engaged with the corresponding terminal 17. The interior insert 21 is annularly formed. A portion of the interior insert 21 is formed as a support 27 (see FIG. 2) for the electrically conductive path 15. The support 27 is formed and placed on a lower side of the interior insert 21 in the drawing.

The exterior insert 22 is formed as an area to be inserted and placed on an exterior side of the tubular body 16 when engaged with the corresponding terminal 17. The exterior insert 22 is annularly formed.

Spacing between the interior insert 21 and the exterior insert 22 is formed as the terminal insert groove 23. The terminal insert groove 23 is formed into a shape that encloses an entire circumference of the terminal 17. A bottom of the terminal insert groove 23 is formed into a shape against which an end face of the terminal 17 butts when the protector 18 is completely engaged with the tubular body 16. The bottom of the groove is placed at a position of an interior surface of the terminal opening cover 25.

The confirmation opening 24 is positioned and formed at a location in an upper side of the interior insert 22 continuous to the terminal opening cover 25. The confirmation opening 24 is formed into a shape that establishes continuity with the terminal insert groove 23 and that enables observation of the terminal 17 of the tubular body 16 from the outside. As a result of the confirmation opening 24 being formed, the protector 18 enables the user to easily confirm whether or not the terminal 17 butts against the end face of the tubular body. Accordingly, incomplete engagement of the protector 18 with the terminal 17 is inhibited, and workability associated with engagement becomes improved.

If it is possible to easily determine if a state of normal engagement is achieved, problems, such as disengagement of the protector 18, spacing between the protector 18 and the terminal 17, and a short measurement, can be prevented, and quality and reliability enhancement can be achieved. If the protectors 18 are in a normal state of engagement, the location of the tubular body 16 at each of the terminals 17 becomes stable, which might also contribute to measurement assurance to be described later.

The terminal opening cover 25 is formed as a wall oriented in a direction orthogonal to the axis of the tubular body 16. The terminal opening cover 25 is also formed as an area that covers the opening of each of the terminals of the tubular body 16. An exterior surface of each of the terminal opening covers 25 of the embodiment is formed as a fiducial surface 28. The fiducial surface 28 is a surface that is to serve as a criterion at the occasion of work for bending the tubular body 16 (the fiducial surface 28 serves as a criterion for a bend position of the bender, or the like, or a criterion for a fix position). The electrical conductive path pullout hole 26 is formed at a center of each of the terminal opening covers 25 that each have such a fiducial surface 28.

Each of the electrically conductive path pullout holes 26 is formed in conformance with the cross sectional profile of the electrically conductive path 15. In the embodiment, the electrically conductive path pullout holes 26 are formed so as to assume openings with an oval shape. Moreover, in the embodiment, the electrically conducive path pullout holes 26 is formed into a tubular shape that projects along the axis of the tubular body 16. Incidentally, as a result of the electrically conductive path pullout hole 26 being formed into a tubular shape, an area of the each of the electrically conductive path pullout hole 26 for supporting the electrically conductive path 15 can be increased.

As a result of the protectors 18 being engaged with the respective terminals 17 of the tubular body 16, the electrically conductive path 15 comes to be pulled out of the electrically conductive path pullout hole 26.

Since a high voltage cabtyre cable is used as the electrically conductive path 15 of the embodiment as mentioned above, a layout of unillustrated two conductors in the electrically conductive path 15 is structurally held. Since the electrically conductive path pullout hole 26 is formed in conformation with the cross sectional profile of the electrically conducive path 15. Therefore, even if two high voltage electric wires are used while being placed side by side, the layout of the conductors is maintained. The electrically conductive path 15 comes to be pulled in a predetermined direction without a twist.

The electrically conductive path pullout hole 26 is formed into a shape that can sustain the state of layout as mentioned above and that enables pull out of the electrically conductive path in a predetermined direction.

The roll prevention portion 32 is formed as an area that is mounted on a predetermined loading/positioning surface P without rolling. The roll prevention portion 32 of the embodiment is formed into a planar shape. The roll prevention portion 32 is formed in a lower portion of the terminal engagement section 20. The roll prevention portion 32 is formed so as to make a notch in the lower portion of the terminal engagement section 20.

As a result of formation of the roll prevention portion 32, an outer circumference of the terminal engagement section 20 assumes a non-circular shape. The roll prevention portion 32 is one in the embodiment but is not restricted to the number. Another example of the roll prevention portion will be described in connection with a second embodiment.

In the embodiment, the roll prevention portion 32 assuming a planar shape is formed in the terminal engagement section 20. Accordingly, a flange 33 having a slight outward bulge is also formed at a position on the outer circumference of the terminal engagement section 20 to be engaged with the tubular body 16 that assumes a circular cross sectional profile.

An electrically conductive path fixing portion 29 and a tubular body fixing portion 30 are additionally formed in the terminal engagement section 20 having a substantial cap shape, such as that mentioned above. The electrically conductive path fixing portion 29 is an area where the electrically conductive path 15 is to be fixed. The electrically conductive path fixing portion 29 is formed into a tongue shape that extends from a lower portion of an opening edge at a leading end of a projection of the electrically conductive path pullout hole 26 along a direction in which the electrically conductive path 15 is pulled out. In the meantime, the tubular body fixing portion 30 is an area where the tubular body 16 is to be fixed. The tubular body fixing portion 30 is formed into a tongue shape that extends from a lower portion of an opening edge at a leading end of a projection of the exterior insert 22 along an exterior surface of the tubular body 16.

The electrically conductive path fixing portion 29 and the tubular body fixing portion 30 are presumed to be formed into an appropriate shape according to a fixing method. In the embodiment, they are formed into a shape that permits adoption of an inexpensive fixing method, such as a tape 31 and a binding band. An acetate tape, a polyester tape, and others, can be mentioned as an example of the tape 31.

Engagement of the protectors 18 and insertion of the electrically conductive path 15 will now be described by reference to the configuration and the structure that have been described above.

In FIG. 2, FIG. 3, and FIG. 5, the protectors 18 are engaged with the terminals 17 of the tubular body 16, respectively. The edges of the openings of the terminals 17 are covered by means of engagement. Specifically, even when the edges include burrs, or the like, the burrs will not affect the electrically conductive path 15. The protectors 18 and the tubular body 16 are fixed by means of winding the tape 31 around a position of the tubular body fixing portion 30 of each of the protectors 18.

After the protectors 18 have been engaged with the respective terminals 17, the roll prevention portion 32 of each of the protectors 18 is placed on the loading/positioning surface P without entailing a roll. The electrically conductive path 15 is inserted into the tubular body 16 from; for instance, the other terminal 17b to the one terminal 17a. Insertion of the electrically conductive path 15 is carried out by way of the electrically conductive path pullout holes 26 of the protectors 18 until a predetermined length L of the electrically conductive path 15 is pulled out of the protector 18 of the one terminal 17a. The electrically conductive path 15 is pulled in a predetermined direction without a twist by means of the protectors 18.

After insertion of the electrically conductive path 15, the tape 31 is wound around the position of the electrically conductive path fixing portion 29 of the protector 18, thereby fixing the protector 18 of the one terminal 17a and the electrically conductive path 15. Since the protector 18 of the one terminal 17a is also fixed to the tubular body 16 as mentioned above, the both the electrically conductive path 15 and the tubular body 16 are fixed at the one terminal 17a.

In FIG. 5, as is seen from the fixed state, the dimension of the electrically conductive path 15 pulled in the predetermined length L by way of the electrically conductive path pullout hole 26 is guaranteed.

The tubular body 16 is subjected to bending with the bender by utilization of the fiducial surface 28 of the protector 18 of the one terminal 17a, whereby the bend 19 is formed in the tubular body 16. The dimension of the electrically conductive path 15 pulled in the predetermined length L is naturally guaranteed during bending work of the bend 19. Moreover, the orientation and the layout of the electrically conductive path 15 pulled out of the one terminal 17a and the other terminal 17b are also naturally maintained by means of the protectors 18.

After bending work is performed with the bender, the electrically conductive path 15 and the tubular body 16 are fixed in the same manner as mentioned above at the other terminal 17b of the tubular body 16. Specifically, the tubular body 16 and the electrically conductive path 15 are fixed by way of the protector 18 engaged with the other terminal 17b of the tubular body 16.

As has been described by reference to FIG. 1 to FIG. 5, the wire harness 9 includes as its configuration the terminal engagement sections 20 to be engaged with the respective terminals 17 of the tubular body 16 and the protectors 18 that each includes the roll prevention portion 32 formed in each of the terminal engagement section 20. Therefore, there are yielded an advantage of the ability to protect the electrically conductive path 15 pulled out of the tubular body 16 against the edges and another advantage of the ability to prevent rolling of the tubular body 16, to thus provide a stable position of the tubular body 16 and, by extension, enhance workability.

Since the position of the tubular body 16 is made stable, stable positioning can contribute to preventing occurrence of a twist in the electrically conductive path 15 and dimensional variations attributable to the twist. This also yields an advantage of the ability to provide stable quality. Twist prevention enables inevitable pullout of the electrically conductive path 15 in a predetermined orientation and, for this reason, is effective.

Furthermore, enhancement of workability and prevention of occurrence of dimensional variations are achieved concurrently with protection of the electrically conductive path 15. Accordingly, a necessity for making additional work on the tubular body 16 and addition of a custom-designed component can be obviated, which in turn yields an advantage of the ability to cost reduction.

(Second Embodiment)

Figure 6A:
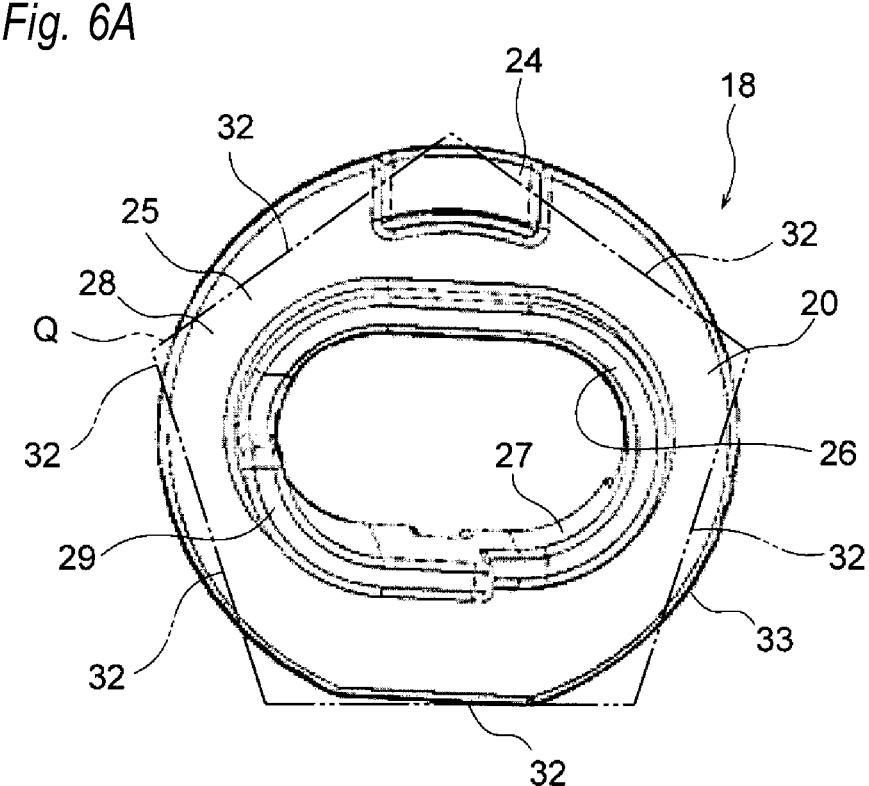
FIGS. 6A and 6B are diagrams showing other examples of the protector.
Figure 6B:
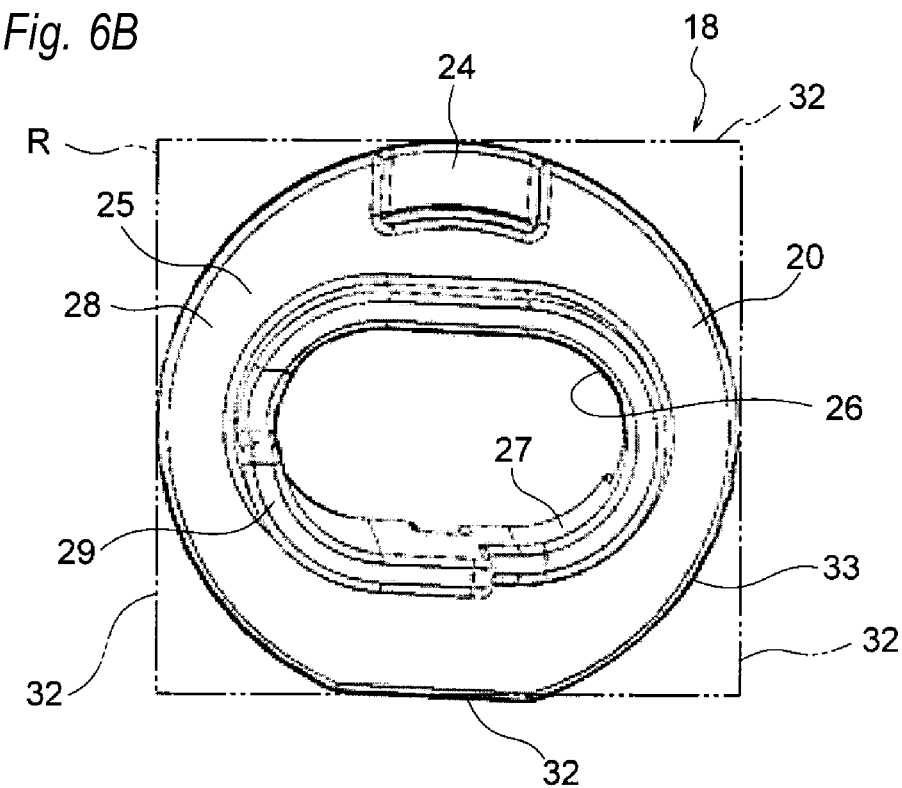

A second embodiment is described by reference to the drawings. FIGS. 6A and 6B are drawings showing another example of the protector. The constituent members that are basically identical with their counterparts described in connection with the first embodiment are assigned the same reference numerals, and their repeated, detailed explanations are omitted for brevity. The second embodiment naturally yields the same advantages yielded by the first embodiment.

In FIGS. 6A and 6B, each of the protectors 18 is formed such that the outer circumference of the terminal engagement section 20 assumes a polygonal shape as designated by phantom lines Q and R, thereby forming a plurality of roll prevention portions 32. In an example shown in FIG. 6A, five roll prevention portions 32 are formed. In an example shown in FIG. 6B, four roll prevention portions 32 are formed.

In addition, it is natural that the present invention be susceptible to various modifications without departing a gist of the present invention.

According to the present invention, it is directed to the wire harness including as its configuration the terminal engagement section to be engaged with the terminal of the tubular body and the protector that includes the roll prevention portion formed in each of the terminal engagement section. Therefore, there are yielded an advantage of the ability to protect the electrically conductive path(s) pulled out of the tubular body and another advantage of the ability to prevent rolling of the tubular body, to thus provide a stable position of the tubular body and, by extension, enhance workability. Further, under the present invention, the position of the tubular body is made stable, to thus be able to contribute to preventing occurrence of a twist in the electrically conductive path(s) and dimensional variations attributable to the twist. This also yields an advantage of the ability to provide stable quality. Twist prevention enables inevitable pullout of the electrically conductive path in a predetermined orientation and, for this reason, is effective. Furthermore, enhancement of workability and prevention of occurrence of dimensional variations are achieved concurrently with protection of the electrically conductive path(s). Accordingly, a necessity for making additional work on the tubular body and addition of a custom-designed component can be obviated, which in turn yields an advantage of the ability to cost reduction.

What is claimed is:

1. A wire harness comprising:
   at least one electrically conductive path;
   a rotatable tubular body into which the at least one electrically conductive path is to be inserted; and
   a protector configured to be engaged with a terminal of the rotatable tubular body,
   wherein the protector comprises:
     a terminal engagement section configured to be engaged with the terminal of the rotatable tubular body; and
     a roll prevention portion configured to serve as an area mounted on a predetermined mounting surface without rolling, the roll prevention portion being formed in the terminal engagement section,
   wherein the terminal engagement section covers the terminal of the rotatable tubular body,
   wherein the terminal engagement section comprises:
     an interior insert to be placed on an interior side of the terminal when the protector is engaged with the terminal;
     an exterior insert to be placed on an exterior side of the terminal when the protector is engaged with the terminal; and
     a terminal insert groove formed between the interior insert and the exterior insert, and configured to enclose an entire circumference of the terminal,
   wherein an electrically conductive path fixing portion is formed in the terminal engagement section, and
   wherein the electrically conductive path fixing portion extends away from the rotatable tubular body along a direction in which the electrically conductive path is pulled out.

2. The wire harness according to claim 1, wherein,
   when the at least one electrically conductive path consists of a single electrically conductive path, the single electrically conductive path comprises a plurality of conductors aligned in a predetermined direction;
   when the at least one electrically conductive path comprises a plurality of electrically conductive paths, the plurality of electrically conductive paths are aligned in a predetermined direction;
   an electrically conductive path pullout hole is formed in the terminal engagement section as an area where the at least one electrically conductive path is to be pulled out of the rotatable tubular body; and
   the electrically conductive path pullout hole is formed into a shape so as to maintain the alignment achieved in the predetermined direction.

3. The wire harness according to claim 1, wherein the roll prevention portion comprises at least one planar shape.

4. The wire harness according to claim 1, wherein the terminal engagement section is formed substantially into a cap shape that covers the terminal of the rotatable tubular body.

\* \* \* \* \*